United States Patent
Liang et al.

(10) Patent No.: US 10,136,275 B2
(45) Date of Patent: Nov. 20, 2018

(54) FRAMEWORK AND APPLICATIONS FOR PROXIMITY-BASED SOCIAL INTERACTION

(71) Applicant: Microsoft Technology Licensing, LLC, Redmond, WA (US)

(72) Inventors: Chieh-Jan Mike Liang, Beijing (CN); Feng Zhao, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/898,354

(22) PCT Filed: Jun. 14, 2013

(86) PCT No.: PCT/CN2013/077210
§ 371 (c)(1),
(2) Date: Dec. 14, 2015

(87) PCT Pub. No.: WO2014/198050
PCT Pub. Date: Dec. 18, 2014

(65) Prior Publication Data
US 2016/0135026 A1    May 12, 2016

(51) Int. Cl.
*H04B 1/707* (2011.01)
*H04W 4/20* (2018.01)
(Continued)

(52) U.S. Cl.
CPC .............. *H04W 4/206* (2013.01); *G06F 9/54* (2013.01); *G06Q 30/0241* (2013.01);
(Continued)

(58) Field of Classification Search
CPC ........... H04W 88/181; H04W 72/1215; H04W 28/0231
(Continued)

(56) References Cited

U.S. PATENT DOCUMENTS 6,327,535 B1 * 12/2001 Evans et al. ............ G06F 17/10
  701/300
6,748,066 B1 *  6/2004 Espejo .................. H04M 3/493
  379/114.2
(Continued)

FOREIGN PATENT DOCUMENTS

CN      101069373      11/2007
CN      101741882 A     6/2010
(Continued)

OTHER PUBLICATIONS

Supplementary European Search Report dated Jun. 9, 2016 for European Patent Application No. 13886995.3, 6 pages.
(Continued)

*Primary Examiner* — William D Cumming
(74) *Attorney, Agent, or Firm* — Merchant & Gould

(57) ABSTRACT

A framework for use in developing proximity-based social interactions (PSIs) shows energy efficiency, topology robustness, and a lessened load for group participants. Implementations of the framework may include PSI-specific application hints to aggregate and schedule pending transmissions and match delivery requirement, topology structure and maintenance schemes that provide robustness and improve efficiency, and load-distributing group dissemination protocols.

20 Claims, 7 Drawing Sheets

(51) Int. Cl.
| | |
|---|---|
| *H04W 4/02* | (2018.01) |
| *G06F 9/54* | (2006.01) |
| *H04L 1/18* | (2006.01) |
| *G06Q 30/02* | (2012.01) |
| *H04W 4/21* | (2018.01) |
| *H04L 1/00* | (2006.01) |

(52) U.S. Cl.
CPC .......... *H04L 1/1867* (2013.01); *H04W 4/023* (2013.01); *H04W 4/21* (2018.02); *H04L 2001/0093* (2013.01); *Y02D 70/00* (2018.01); *Y02D 70/142* (2018.01); *Y02D 70/144* (2018.01); *Y02D 70/164* (2018.01); *Y02D 70/166* (2018.01)

(58) Field of Classification Search
USPC .......... 455/560, 265, 192.2, 414.1; 370/329, 370/338, 350, 465; 701/300; 375/141
See application file for complete search history.

(56) References Cited

U.S. PATENT DOCUMENTS

| | | | |
|---|---|---|---|
| 8,341,289 B2 | 12/2012 | Hellhake et al. | |
| 8,351,417 B2 | 1/2013 | Chen et al. | |
| 9,396,092 B1* | 7/2016 | Kuo | G06F 11/3664 |
| 9,696,923 B2* | 7/2017 | Niu | G06F 3/0619 |
| 9,720,835 B1* | 8/2017 | Shilane | G06F 12/0833 |
| 2003/0083102 A1* | 5/2003 | Blum | H04W 88/181 |
| | | | 455/560 |
| 2004/0005870 A1* | 1/2004 | Yla-Jaaski | H04B 7/2668 |
| | | | 455/265 |
| 2004/0057456 A1* | 3/2004 | He | H04L 47/14 |
| | | | 370/465 |
| 2004/0063411 A1* | 4/2004 | Goldberg | G01S 19/235 |
| | | | 455/192.2 |
| 2004/0071095 A1* | 4/2004 | Raisanen | H04L 41/00 |
| | | | 370/252 |
| 2004/0082318 A1* | 4/2004 | Lane | G08G 1/133 |
| | | | 455/414.1 |
| 2005/0001762 A1* | 1/2005 | Han | G01S 19/44 |
| | | | 342/357.59 |
| 2005/0001763 A1* | 1/2005 | Han | G01S 19/44 |
| | | | 342/357.31 |
| 2005/0281320 A1* | 12/2005 | Neugebaur | H04B 1/707 |
| | | | 375/141 |
| 2006/0117319 A1* | 6/2006 | Ayres | G06F 9/5044 |
| | | | 718/104 |
| 2008/0137669 A1* | 6/2008 | Balandina | H04L 45/00 |
| | | | 370/400 |
| 2010/0010826 A1 | 1/2010 | Rosenthal et al. | |
| 2010/0040042 A1* | 2/2010 | van Greunen | H04B 1/7156 |
| | | | 370/350 |
| 2011/0103355 A1* | 5/2011 | Sun | H04W 72/1215 |
| | | | 370/338 |
| 2011/0125921 A1* | 5/2011 | Karenos | H04L 45/00 |
| | | | 709/240 |
| 2011/0173474 A1* | 7/2011 | Salsbery | G06F 1/206 |
| | | | 713/323 |
| 2013/0097246 A1* | 4/2013 | Zifoni et al. | G06F 15/16 |
| | | | 709/204 |
| 2013/0136067 A1* | 5/2013 | Praveenkumar | H04W 28/0231 |
| | | | 370/329 |
| 2013/0143529 A1 | 6/2013 | Leppanen | |
| 2013/0290758 A1* | 10/2013 | Quick | G06F 1/3203 |
| | | | 713/323 |
| 2016/0135026 A1* | 5/2016 | Liang | H04W 4/023 |
| | | | 455/456.1 |
| 2016/0266824 A1* | 9/2016 | Niu | G06F 12/02 |
| 2017/0103440 A1* | 4/2017 | Xing | H04W 4/90 |
| 2017/0115742 A1* | 4/2017 | Xing | G06F 3/012 |
| 2018/0150280 A1* | 5/2018 | Rhee | G10L 15/1822 |

FOREIGN PATENT DOCUMENTS

| | | |
|---|---|---|
| CN | 101827177 | 9/2010 |
| CN | 102272721 A | 12/2011 |

OTHER PUBLICATIONS

"AllJoyn", Apr. 3, 2013, <<https://www.alljoyn.org/>>, 4 pages.
Baber, et al., Social Networks and Mobile Games: The Use of Bluetooth for a Multiplayer Card Game, In Proceedings of Mobile Human Computer Interaction, Sep. 13, 2004, <<http://xa.yimg.com/kq/groups/19350330/1343945536/name/Lecture+notes+in+compuetr+science9.pdf>>,10 pages.
"Buzzmob", Apr. 3, 2013, <<http://www.buzzmob.com/>>,1 page.
"Foursquare", Apr. 3, 2013, <<https://foursquare.com/>>, 2 pages.
Koukoumidis, et al. "Pocket Cloudlets", In Proceedings of the 16th International Conference on Architectural Support for Programming Languages and Operating Systems, Mar. 5, 2011, <<http://research.microsoft.com/pubs/147288/asplos210-koukoumidis.pdf>>, 13 pages.
Li, et al., "Towards Reliable and Efficient Data Dissemination in Heterogeneous", In IEEE International Symposium on Parallel and Distributed Processing, Apr. 14, 2008, 12 pages.
"LoKast—Real-time Interactive Spaces", Apr. 3, 2013, <<http://www.lokast.com/>>, 1 page.
Mawji et al., "Efficient Content Distribution for Peer-to-Peer Overlays on Mobile Ad Hoc Networks" In Journal of Advanced Research, vol. 2, Issue 3, Jul. 2011, 15 pages.
Mohapatra, et al., Where-Fi: A Dynamic Energy-Efficient Multimedia Distribution Framework for MANETs, In Proceedings of the SPIE, vol. 6818, Jan. 2008, 13 pages.
Ozkasap, et al. "Epidemic-based Approaches for Reliable Multicast in Mobile Ad Hoc Networks", In ACM SIGOPS Operating Systems Review, vol. 40, Issue 3, Jul. 2006, 7 pages.
PCT Search Report and Written Opinion dated Mar. 20, 2014 for PCT Application No. PCT/CN2013/077210, 13 Pages.
Perez, "Nearly 40% of Facebook Use is from Mobile Apps", Dec. 29, 2011, <<http://techcrunch.com/2011/12/29/nearly-40-of-facebook-use-is-from-mobile-apps/>>, 2 pages.
Repantis, et al., "Data Dissemination and Query Routing in Mobile Peer-to-Peer Networks", In Book—Mobile Peer-to-Peer Computing for Next Generation Distributed Environments: Advancing Conceptual and Algorithmic Applications, May 2009, 24 pages.
Spanek, et al., "The BlueGame Project: Ad-hoc Multilayer Mobile Game with Social Dimension", In Proceedings of the ACM Conference on Emerging Network Experiment and Technology, Dec. 10, 2007, <<https://www.cs.cas.cz/semweb/download.php?file=07-11-spanek&type=pdf>>, 2 pages.
"Watch and Share LIVE Video Broadcasts from your Smartphone—Color", Apr. 3, 2013, <<http://www.color.com/>>,1 page.
Zhang, et al., "Fine-grained Private Matching for Proximity-based Mobile Social Networking", In Proceedings of the IEEE INFOCOM, Mar. 25, 2012, <<http://enpub.fulton.asu.edu/sensip/SenSIP_Papers/PrivateMatching%20_yanchao.pdf>>, 9 pages.
Zhang, et al., "SwordFight: Enabling a New Class of Phone-to-Phone Action Games on Commodity Phones", In Proceedings of the 10th International Conference on Mobile Systems, Applications, and Services, Jun. 25, 2012, <<http://research.microsoft.com/en-us/um/people/moscitho/Publications/MobiSys_2012.pdf>>, 14 pages.
European Office Action dated Oct. 21, 2016 for European Patent Application No. 13886995.3, a counterpart foreign application of U.S. Appl. No. 14/898,354, 5 pages.
Supplementary European Search Report dated Sep. 27, 2016 for European Patent Application No. 13886995.3, 6 pages.
"First Office Action and Search Report Issued in Chinese Patent Application No. 201380077470.1", dated Mar. 5, 2018, 11 Pages.
"Office Action Issued in European Patent Application No. 13886995.3", dated Mar. 23, 2018, 4 Pages.
"Second Office Action Issued in Chinese Patent Application No. 201380077470.1", dated Aug. 30, 2018, 11 Pages.

* cited by examiner

FRAMEWORK AND APPLICATIONS FOR PROXIMITY-BASED SOCIAL INTERACTION

CROSS-REFERENCE TO RELATED APPLICATION

This Application is the National Stage of International Application No. PCT/CN2013/077210, filed Jun. 14, 2013, the entire disclosure of which is incorporated herein by reference.

BACKGROUND

Smartphones, tablet computers, and similar personal computing devices are everywhere. These devices, with their connectivity, applications, and features have allowed users to further extend their presence into the virtual world. Thus, interaction with other people, via their devices, in far flung corners of the world has become exceedingly possible, and relatively simple. In addition to providing long-distance connection, these devices are also being used to enhance personal, or close-range, interactions. For example, the user base for Proximity-based Social Interaction (PSI) applications has seen rapid growth. PSI applications are aimed at networking in a limited, physical neighborhood.

PSI applications are still in their relative infancy, and current PSI frameworks lack a set of well-defined APIs and services that balance development overhead and control. Some platforms include proximity services, but they abstract away many low-level intricacies, often at the expense of application-specific tuning of certain parameters such as device presence advertisement frequency. Moreover, existing proximity services offer only unicast user datagram protocol (UDP) socket, complicating the realization of efficient group communication. At an opposite extreme, other platforms expose many functionalities and controls, but application developers are taxed with using them properly.

SUMMARY

This document describes an improved framework for use in developing proximity-based social interactions. Implementations of the framework may show improved energy efficiency, increased topology robustness, and/or a lessened load for group participants. Implementations of the framework may include PSI-specific application hints to aggregate and schedule pending transmissions and match delivery requirement, topology structure and maintenance schemes that provide robustness and improve efficiency, and/or load-distributing group dissemination protocols.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
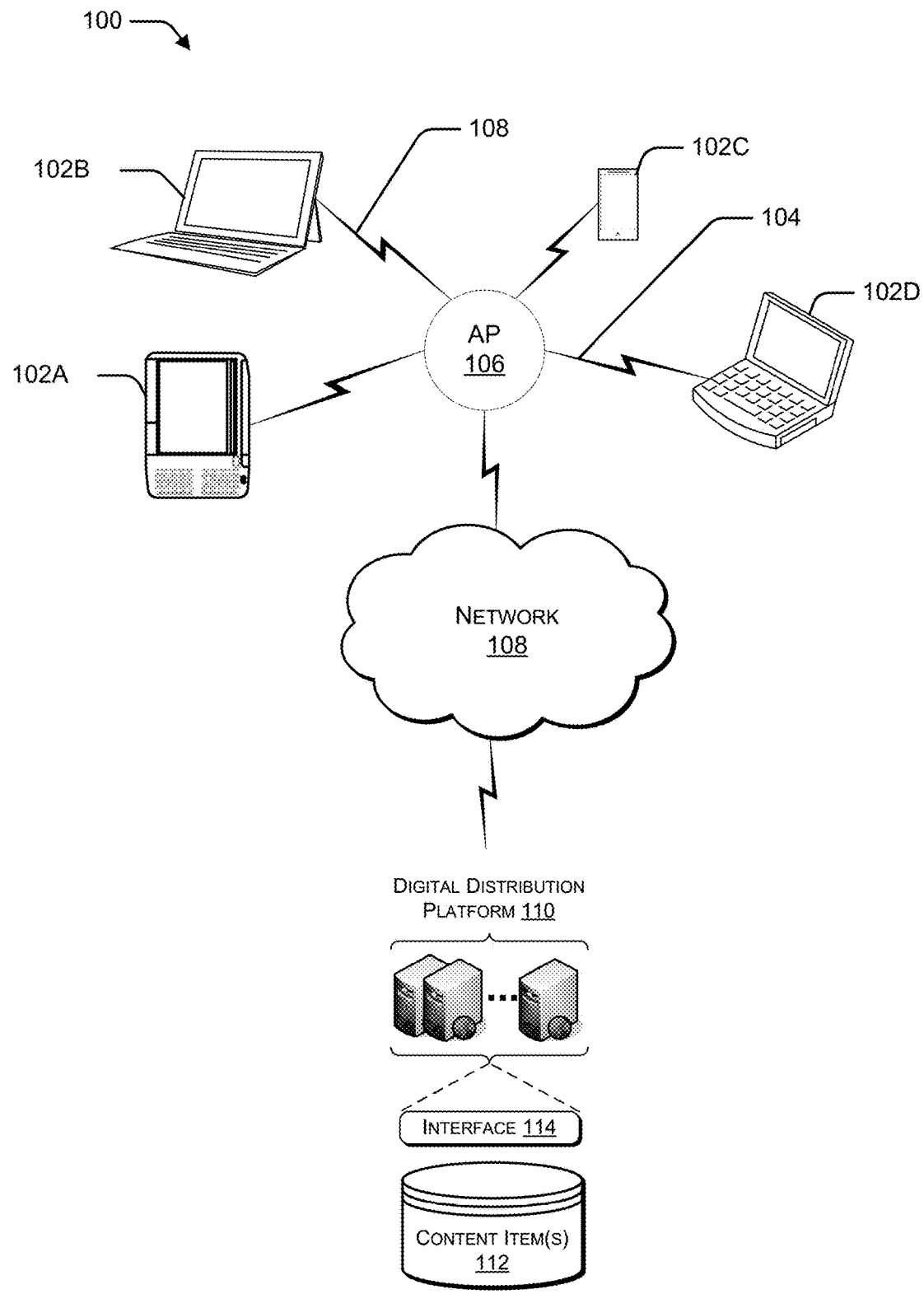
FIG. 1 is a schematic diagram of an example environment in which proximity-based social interactions may be implemented.

Introduction to Proximity-Based Social Interaction (PSI) Applications

Proximity-based Social Interaction (PSI) applications allow for networking of individuals in a common geographical location. Thus, unlike conventional social networking and/or gaming applications that allow users to interact over any distance, PSI applications are intended to be used by people using devices in the same physical proximity (e.g., other patrons in a coffee shop).

To date, most PSI applications are multi-player games, content-sharing tools, or social applications. For example, the close proximity of users allows them the interaction of, for example, a board or card game, but without the need for a board, playing pieces, and/or cards. Content-sharing applications enable same-proximity users to see the same pictures, videos, conversations, and the like. PSI social applications often allow for discovery of and communication with individuals (whether or not previously known) within a proximity.

Regardless of the purpose of the PSI app, each has a generally similar design pattern. Specifically, most PSI applications include three main design aspects. First, the device must be advertised for discovery before it can commence interaction with other devices. This often includes advertisements related to both neighbor discovery, i.e., the physical presence of the device, as well as service discovery, i.e., information about the capabilities of the device, such as information about applications and services on the device. Second, a discovered device and a discovering device must agree to and establish a logical link, i.e., there must be a connection handshake. The logical link will generally specify parameters of the interface between the devices, including but not limited to, the physical medium, end-point addresses, end-point roles, and delivery reliability. For example, the link may establish which radio is used for transmission, e.g., Wi-Fi Direct or Bluetooth, and/or it may establish roles for the nodes (such as identifying one node as a soft access point in the context of Wi-Fi Direct). Finally, after a device's presence is advertised and a link is made via a connection handshake, APIs transfer data over the logical link.

Although this base design for PSI applications is readily identifiable, there are a diverse set of application requirements. For instance, the traffic (and therefore network) requirements for each of the presence advertisement, the handshake, and the data transfer are very different. Table 1 illustrates examples of these differences.

TABLE 1

Traffic requirements for PSI application message-types.

| | Traffic Volume | Frequency | Reliability Requirement | Delay Tolerant? |
|---|---|---|---|---|
| Presence Advertisement | Low | Periodic | Low | Yes |
| Handshake | Low | On-demand | Low | No |
| Data transfer | High | On-demand | High | Maybe |

The varied requirements at each stage dictate that these messages often should be handled differently. Further compounding the issue is that network requirements across PSI applications may vary according to some specification. For example, a payment app can mandate that two participating parties have visual confirmation, thus requiring that transfer take place with contact-based radios, such as via Near Field Communication (NFC). Other applications may work fine with coarse-grained discoveries, e.g., via cell tower-based positioning. By way of further example, a developer may rely on the operating system to infer traffic semantics with a generic model for all applications. This approach unloads a developer's burden in matching network requirements. At the other extreme, an operating system can expose all low-level network information and functionalities to applications, but this may overwhelm inexperienced or unsophisticated developers, who will not know how to properly use all functionalities, sometimes to disastrous results.

As should be appreciated, developing PSI applications that achieve a desired result may be a difficult task. Optimizing the applications, e.g., to minimize energy consumption and distribute responsibilities among nodes in the PSI is an even greater challenge. Two of the major challenges associated with PSI applications and their development are device resource management and network maintenance. By way of a single example, mobile devices have several built-in radio technologies including long-range radio technologies (e.g., cellular and wireless network) and short-range radio technologies (e.g., Wi-Fi Direct, Bluetooth Low Energy, and Near-Field Communication). Deciding which radio technology to use to optimize user experience and limit power drain is often a daunting task.

The radio options and inherent design tradeoffs associated therewith represent but one example of considerations that go into optimizing PSI applications.

Example Environment

FIG. 1 is a schematic diagram of an example environment 100 in which respective electronic devices 102A, 102B, 102C, 102D (collectively "devices 102") act as a plurality of nodes. The nodes are communicatively coupled to each other via wireless signals 104. These signals 104 facilitate bidirectional transfer of data, information, queries, and packets. In the illustrated embodiment, the nodes are arranged in a star topography, with an access point 106 acting as the hub. This topography will be described in more detail below. In other implementations, the devices may be arranged in other topographies. Moreover, although Wi-Fi communication uses an access point, other communication methods may be used, which may not support or require an access point. In other implementations, the nodes may be arranged to communicate directly with each other, without the need for the access point 106 or similar hub.

In the illustrated example, four devices/nodes are arranged in close physical proximity to each other. As noted above, implementations of this disclosure are concerned with proximity-based social interactions, which are characterized by a limited physical proximity, often up to about a 150-foot radius. The physical proximity may be defined in geographical terms, e.g., determined using global positioning system (GPS). Other methodologies also may be used to define the physical proximity. For example, nodes may be in a physical proximity if they have access to a certain Local Area Network (LAN), such as a wireless network.

By way of example, not limitation, the electronic devices 102 may include mobile phones, tablet computer systems, electronic book readers, multifunctional devices, desktop computer systems, laptop computer systems, game console systems, and personal media players. Thus, the devices 102 may form a heterogeneous network of nodes, i.e., because the nodes are formed by different devices 102. Not only may the actual devices 102 be different, but the nodes/devices may differ based on generation, model, capability, operating system, or the like. Although four devices 102 are illustrated, any number of electronic devices may be included. Moreover, although the nodes are illustrated as being connected through a single access point, additional access points (or no access point at all) also may be used. The devices 102 may be linked in some fashion to form a neighborhood of devices capable of running the same PSI app or versions of the same application in implementations of this disclosure.

As illustrated in FIG. 1, the devices 102 also may be connected via a network 108 to a digital distribution platform 110. The network 110 may be any type of communication network, including but not limited to a LAN, a wide-area network, the Internet, a wireless network, a cable television network, a telephone network, a cellular communications network, or a combination of the foregoing. The devices 102 may be configured to allow a user to browse for and obtain from (e.g., download) content 112 from the digital distribution platform 110. The content 112 may include any form of electronic information, including but not limited to software, including software in the form of an application, such as a PSI app.

Applications and user interfaces may be used in conjunction with the devices 102 to interact with the digital distribution platform 110. The platform 110 may also expose lower-level interfaces or application programming interfaces (APIs), via the network 108, for example, to allow the devices 102 to access functionality without direct user interaction. To this end, use of some applications may require the device to have access to the platform 110, or some other third party provider, which access may be facilitated by the network 108.

The platform 110 may be implemented as an online merchant or vendor, such as an application store or market. The platform 110 may have a client interface 114 used by the devices 102 to interact therewith. The client interface 114 may include a virtual storefront or other type of online interface for interaction with consumers and/or devices. The client interface may also expose a graphical, web-based user interface and in some embodiments it may expose programmatic interfaces or APIs used to obtain content items and related services.

Although the embodiment of FIG. 1 illustrates the devices 102 as accessing the network 108, and thus the digital distribution platform 110, via the access point 106, they may access the platform 110 directly, e.g., through some other network, such as a cellular network. In the illustrated embodiment, every device 102 may run the same PSI app, which app may have been downloaded from the same digital distribution platform 110 or a different digital distribution platform 110 at some point in time. Of course, any number of devices may access the network 108 via the access point 106, regardless of whether they are running the same PSI app (or any PSI app at all). As noted above, the devices 102 running the same PSI app define a neighborhood of devices.

Example Electronic Device

Figure 2:
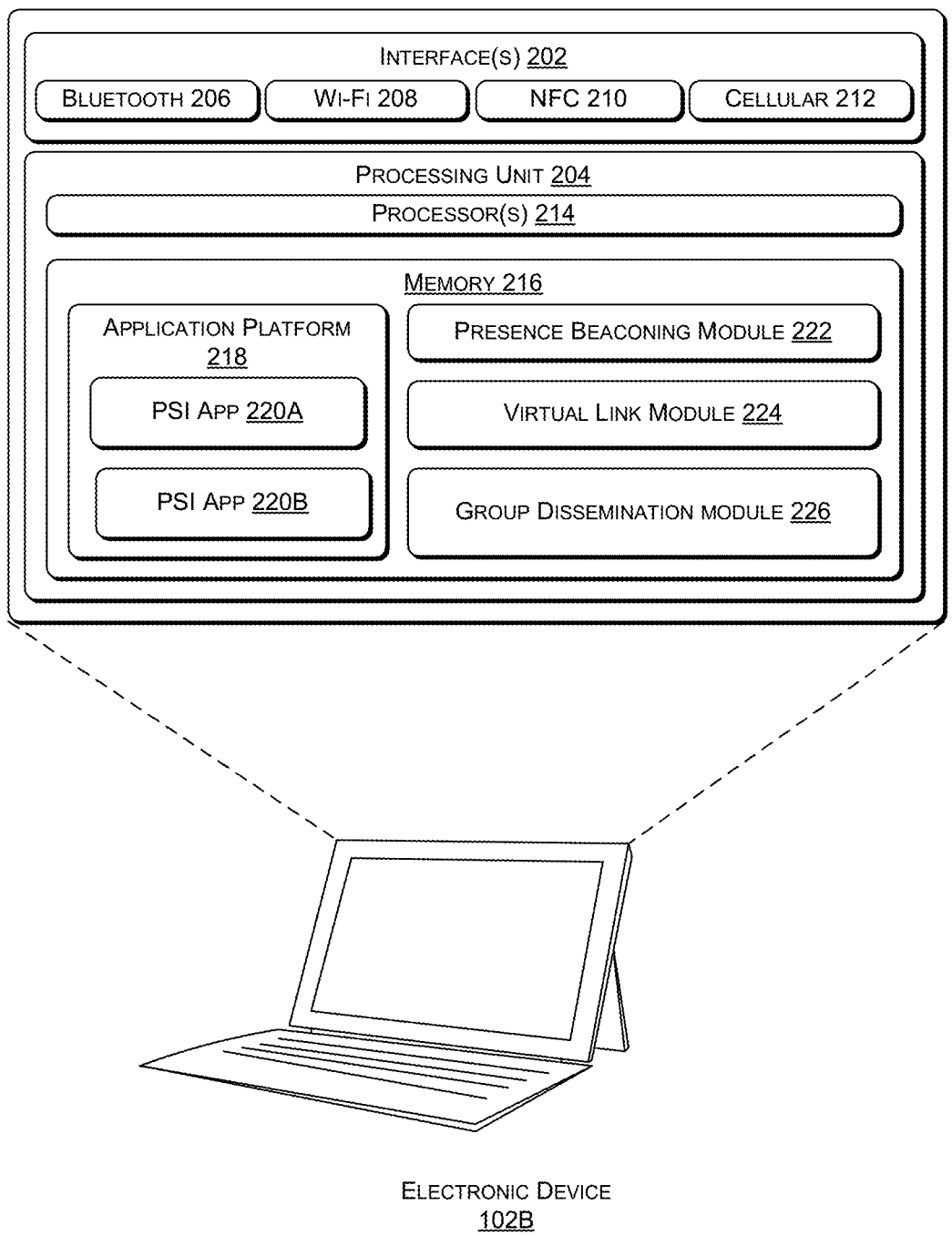
FIG. 2 is a schematic diagram showing details of an example electronic device, acting as a node, in the environment of FIG. 1.

FIG. 2 is a schematic illustration showing the electronic device 102B in more detail. The electronic device 102B is representative of each of the devices 102. It includes one or more communication interfaces 202 and a processing unit 204.

In the illustrated embodiment, the communication interfaces 202 are embodied as one or more radios that include a radio-frequency (RF) transceiver capable of transmitting and/or receiving RF signals via one or more of a plurality of channels/frequencies. The communication interfaces 202 are illustrated as several interfaces, including a Bluetooth® interface 204, a Wi-Fi interface 206, a Near Field Communication (NFC) interface 208, and a cellular interface 10. Each communication interface 202 may be configured to implement a plurality of different modulation techniques, data rates, protocols, signal strengths, and/or power levels. More, fewer or different communication interfaces may be provided on the device 102B, and each of the devices 102 may have the same or different communication interfaces. Moreover, although embodiments of this disclosure are implemented using wireless communications between nodes, some of the functionality may take place via wired communication. By way of non-limiting example, wired communications may include wired communication network technologies, including Ethernet and USB.

In the illustration of FIG. 2, the processing unit 204 includes one or more processors 214 communicatively coupled to memory 216. The memory 216 may be configured to store one or more software and/or firmware modules, which are executable on the processor(s) 214 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

In the embodiment of FIG. 2, the memory 216 includes an application platform 218 hosting one or more PSI applications 220A, 220B. While FIG. 2 illustrates that the application platform 218 resides locally on the device 102B, in some instances the platform 218 resides, in whole or in part, remotely from the device 102B.

The memory 216 also includes a presence beaconing module 222, a virtual link module 224, and a group dissemination module 226. Each of these modules is provided to cooperate with the PSI applications 220A, 220B, to improve performance of those applications. Generally, the presence beaconing module 222 is configured to control the transmission of presence beacons, which allow a user to be discovered in a neighborhood associated with a PSI app. The virtual link module 224 is configured to establish and maintain a virtual link, which may be formed on top of one or more physical links and that allows continued connection between nodes, even when a physical connection is lost. The group dissemination module 226 is configured to disseminate information, such as object data, from a source to a plurality of receiving nodes, in an efficient and equitable manner. Each of these modules and their respective functionalities will be discussed below in more detail.

Moreover, although illustrated in FIG. 2 as being stored in the memory 216 of electronic device 102B, the application platform 218 and/or any of the modules 222, 224, 226, or portions thereof, may be implemented using any form of computer-readable media that is accessible by computing device 102B. Furthermore, in alternate implementations, one or more components of the memory 216 may be implemented as part of an integrated circuit system on a chip that is part of, or accessible to, the electronic device 102B.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media includes computer readable instructions, data structures, program modules, or other data in a modulated data signal, such as a carrier wave, or other transmission mechanism. As defined herein, computer storage media does not include communication media.

Features of an Example Application Development Framework

Figure 3:
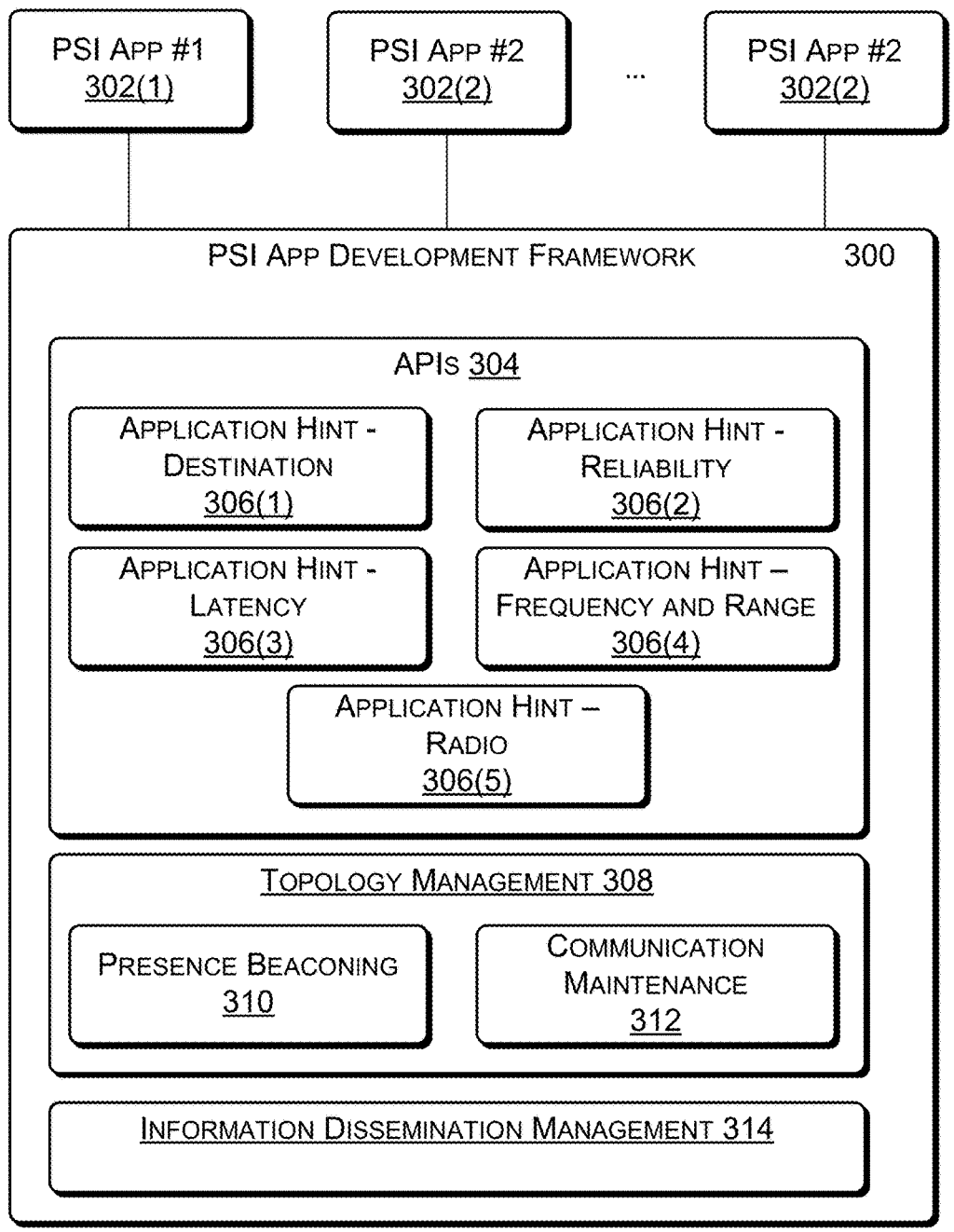
FIG. 3 is a schematic diagram showing additional details of an example device, such as the device illustrated schematically in FIG. 2.

FIG. 3 illustrates schematically an architecture of a framework 300 for developing proximity-based social interaction (PSI) applications 302(1), 302(2), . . . , 302(p). The illustrated framework 300 generally identifies attributes of this disclosure, including application programming interfaces 302 having application hints 306(1)-306(5), tools for topology management 308, which control, for example, presence beaconing 310 and communication maintenance 312, and tools for managing information dissemination 314. Some or all of these interfaces and tools may be used by developers to create PSI applications that are more robust, reliable, and efficient. The components of the framework 300 will be described in more detail, below.

APIs with Application Hints

As noted above, previously-contemplated frameworks for PSI application development are fraught with shortcoming. As one feature of the framework 300 illustrated in FIG. 3 for developing PSI applications the present disclosure includes a set of well-defined APIs and services that balance the development overhead and control. In one aspect, the framework includes PSI-specific application hints to streamline and assist in the development process.

More specifically, the framework 300 identifies and passes application hints to strike a balance between intention expressiveness and development burden. In some embodiments, application hints that are passed include a destination application hint 306(1), a reliability application hint 306(2), a latency application hint 306(3), a frequency and range application hint 306(4), and/or a radio application hint 306(5).

The destination application hint 306(1) asks a developer to specify the intended group size or bands on compatible group sizes. Knowing this size allows specific optimizations for point-to-point transmissions and group dissemination. For example, delivery reliability can be optimized if the number of users is known. In the case of point-to-point transmissions, a simple acknowledgement-and-retransmission mechanism is sufficient to achieve high delivery reliability. But as groups grow, point-to-point transmission, i.e., direct from source to each receiver, places a large burden on the source. This overhead is proportional to the number of receivers, which relates at least in part to the amount of acknowledgements and retransmissions.

The reliability application hint 306(2) asks the developer to specify a reliability requirement for certain transmissions. Doing so can avoid unnecessary overhead. One example is device presence beaconing, where one missing reception does not significantly impact the overall operation. Moreover, data objects with low delivery reliability can be exploited, for example, by artificially dropping packets when low battery life remains.

In one implementation of this framework, two reliability classes are offered for each type of data transmission—best effort and reliable. In this implementation, specifying the best effort reliability class may aid in optimizing energy usage. More particularly, in one example, as the device battery is running low, the framework may drop some pending best effort-type packet transmissions to conserve energy. One 1,500 KB packet transfer over 802.11b can take more than 1 J of energy. Both the battery threshold and the packet drop rate may also be specified by the app developer. Although one contemplated implementation uses two reliability classes, other implementations may utilize one or more other reliability classes, either in addition or as alternative to the two classes noted above.

The delivery latency hint 306(3) allows a developer to set latency tolerances, which can result in improved efficiencies. For example, when latency is tolerated, the framework can schedule packet transmissions to amortize costs.

In one implementation, the latency requirement is specified as a time, e.g., as a number of seconds. The requirement is an estimate, as it is difficult to provide a firm latency guarantee with the delays introduced by the radio hardware and retransmissions. In other implementations, the latency requirement may be specified as a number of packets. For example, the latency requirement may promote aggregation of packets by only sending the packets when a certain number have been aggregated.

The delivery frequency and transmission hint 306(4) defines the behavior and scope of neighborhood/service discovery. For example, applications can specify a higher delivery frequency for beacons to speed up discovery. Higher beaconing frequency can also help the discovery if the rendezvous of two users is short and quick. Specifying the transmission range can be used to set the radio transmission power, but it can also be a hint on the physical radio to use. For example, a payment application can set the beaconing range to be low to force a tighter peer association, e.g., via NFC.

The radio application hint 306(5) allows a developer to specify one or more radios to be used with the application. As noted above, a number of radios may be present on mobile devices, so the framework allows the application to specify which radio(s) to use.

Topology Management

Implementations of a framework for developing PSI applications according to this disclosure also provide for tools to manage the topology of the applications. One implementation provides for improved presence beaconing, which may allow for reliable and energy-efficient presence advertising within a neighborhood of nodes.

In a conventional PSI application, as described in more detail above, a link must be established between devices using the app. Even before the link, though, devices must become aware of each other. Presence beaconing is one conventional way in which a device's presence may be broadcast, i.e., for discovery by other devices. Presence beacons are honed to be limited in broadcast distance, such that any device that can "hear" another device's presence beacon is most likely in close proximity. When both devices are beaconing, it does not matter which device is discovered and which does the discovering. While it may be possible, thus, to have only one node beacon, such is rarely employed because devices may not know that a node is actively beaconing. Moreover, beaconing results in transmission overhead, and thus consumes resources. Requiring a single node to shoulder the burden of all beaconing may be inequitable and may negatively impact battery life and performance of the node.

Figure 4:
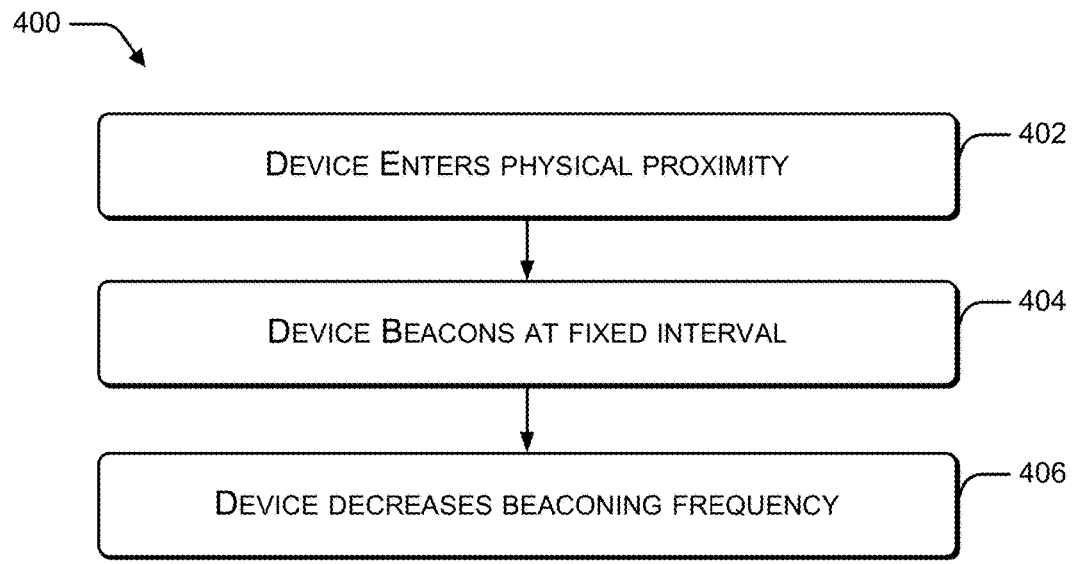
FIG. 4 is a schematic diagram showing details of a PSI application development framework.

Under conventional schemes, presence beaconing occurs at fixed intervals for all devices. Implementations of this disclosure employ presence beaconing with interval decaying. This beaconing process 400 will be described in more detail with reference to FIG. 4. This process, and other processes described in this disclosure, is illustrated as a collection of blocks in a logical flow graph, which represents sequences of operations that can be implemented in hardware, software, or a combination thereof. In the context of software, the blocks represent computer-executable instructions stored on one or more computer storage media that, when executed by one or more processors, cause the processors to perform the recited operations. The order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the electronic devices 102 and framework 300 described above with reference to FIGS. 1-3, other computer architectures may implement one or more portions of these processes, in whole or in part.

In the process 400, at block 402, a device desiring to be discovered to use a PSI app enters a physical proximity. As noted above, the proximity may be predefined by geographical constraints, e.g., a store or a building, or it may be defined by access to a network, such as a WLAN.

Upon entering the proximity, at block 404, the device begins beaconing at an initial frequency. In implementations of the disclosure, presence beaconing commences for a device upon a discoverable call by that device, which may occur upon executing the app on a device, joining a new network, and/or entering a new proximity. The beacon may include an identification unique to the application, i.e., the app ID, as well as information about the device, e.g., available radios. In some embodiments, the initial beaconing interval is passed as an application hint, as described above. In one PSI app developed by the inventors using a framework disclosed herein, presence beaconing was set to occur at one-second intervals. In other implementations, the initial beaconing interval may be determined on a per-device basis. For example, the initial beaconing frequency may vary depending upon a battery life of the device or relative to overheard signals.

After some predetermined amount of time (or a predetermined number of beacons), the device decreases its beaconing frequency (according to some distribution) at block 406. In one design of the framework the frequency is halved at five-beacon intervals. Of course, more or less frequent beacons and more of fewer beacons between frequency changes may also be used and may be instructed via application hint, or at the framework level.

As described, this scheme provides for decaying presence beaconing. A device that is entering a new location (or that is just initiating a PSI app) beacons with greater frequency. And the frequency decreases over time. Thus, devices already connected (or the first device into the proximity) beacon infrequently, with the burden of joining a neighborhood of devices being generally shouldered by devices that are new to the neighborhood. The infrequent beaconing of established devices results in minimal impact at the steady state, but still allows for their discovery.

An example framework according to this disclosure also promotes maintaining communication between nodes using virtual links. PSI applications are generally used on mobile devices. As such, device mobility is all but inevitable. With this mobility comes the likelihood that a device will lose its physical link with one or more other nodes. This disconnection problem may be readily mitigated by fixing on a long-range radio, but long-range radios have inherent shortcomings. For example, they tend to require more energy, may have a greater lag time, and may be less secure. Moreover, PSI applications are concerned with relatively close-range transfer of information, so a long-range radio (e.g., cellular) is likely not a good fit in many instances.

According to embodiments of this disclosure, a virtual link is formed between two nodes, to allow for transfer of information between those nodes. In some implementations, the virtual link is associated with one or more physical links, and the virtual link is maintained so long as at least one of the physical link(s) is maintained. Thus, the virtual link is maintained even if the radio is switched, for example, because one of the users leaves a transmission range of the first radio, disconnecting that radio. Thus, according to an embodiment of this disclosure the virtual link sits on top of several physical links, to hide the complexities of managing multiple radio interfaces.

Figure 5:
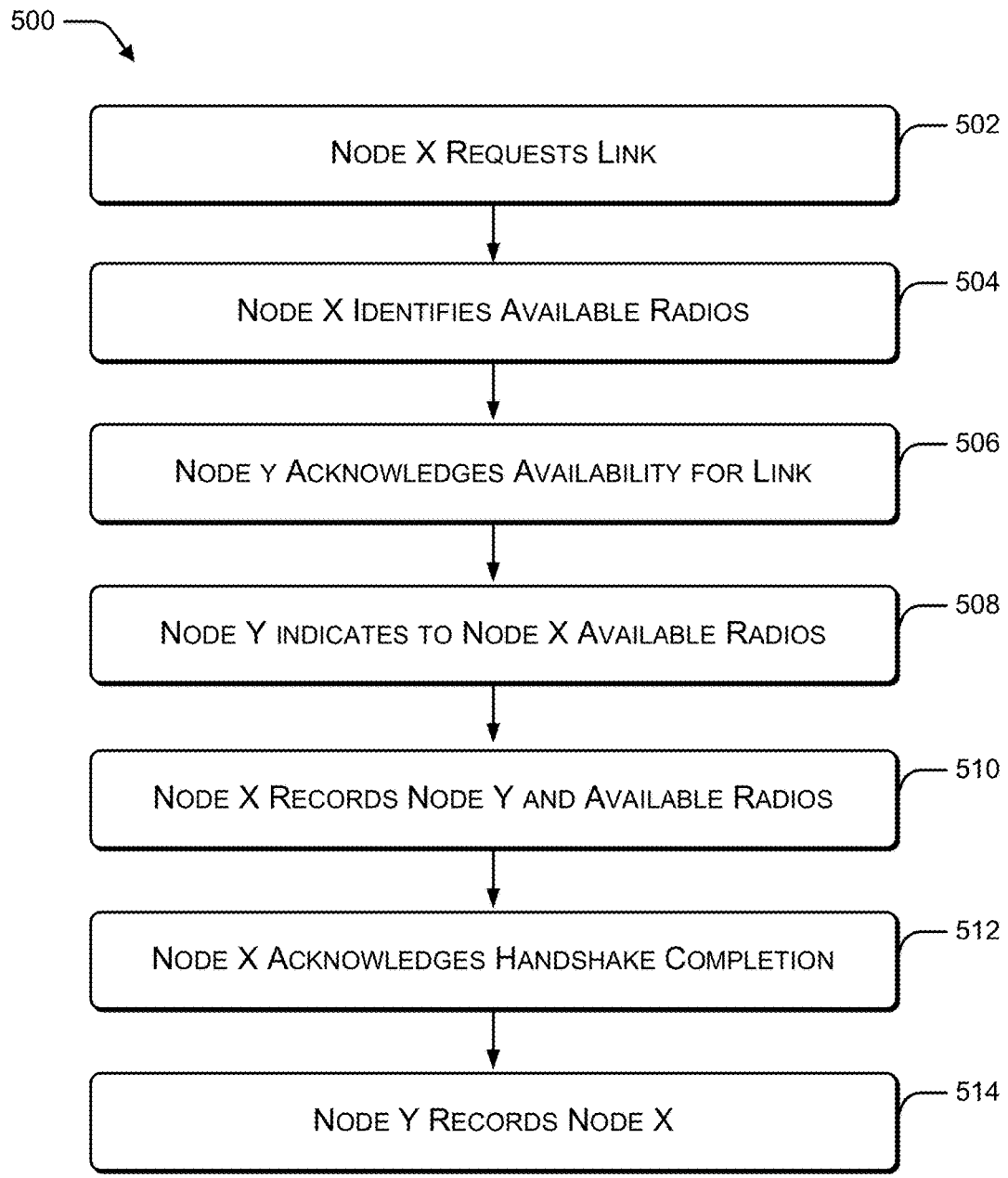
FIG. 5 is a flowchart illustrating an example method of establishing a virtual link between two nodes.

FIG. 5 shows a flow-chart illustrating a process for establishing a virtual link between two nodes, x and y.

Generally, FIG. 5 illustrates a three-way handshake between nodes x and y to establish a virtual link. In some implementations, the information exchanged during the handshake sets up both end points for physical link migration.

At block 502, node x sends a message to node y declaring its intent to establish a virtual link with node y. Contemporaneously therewith, at block 504, node x also sends to node y a list of radio interfaces that node x would like to use for the virtual link. In some implementations, blocks 502 and 504 may be accomplished via a single message from node x to node y.

At block 506, node y acknowledges its availability to form a virtual link with node x. As a part of this acknowledgment, node y may determine that it has room on a peer list to accept node x. Node y may also determine whether it can communicate via one or more of the radios identified by node x. Once node y's availability to form the virtual link is acknowledged, at block 508, node y sends to node x a list of radio interfaces over which it can communicate. In one implementation, the list of radio interfaces is based on node x's list of available radios. In other implementations, the list sent by node y may list all radios available to node y. In some implementations, blocks 506 and 508 may be carried out via a single message from node y to node x.

At block 510, node x records, e.g., in a peer list, information about node y. This information may include an identification of node y and a list of physical radio interfaces available for communication with node y.

At block 512, node x acknowledges to node y completion of the handshake, and at block 514, node y records node x, for example, in a peer list.

With the virtual link established, nodes x and y can transfer data to each other, e.g., via any of the radios determined during establishment of the link, as described above with reference to FIG. 5. The framework may translate the device ID that is the destination of the information to the address of the physical radio interface currently in use. The virtual link may be maintained by monitoring the underlying quality (or the mere existence) of the physical link currently in use. If the physical link has been disconnected, e.g., because the devices associated with nodes x and y move out of range, the framework instructs a switch to a different physical radio interface.

In an idle state, i.e., when there is no active transfer of information between nodes linked virtually, nodes x and y rely on beacons to confirm presence of each other. When node x does not hear a beacon for a predetermined period of time, node x preferably assumes a disconnected state, and switches to another radio to beacon. In one implementation, the framework prioritizes the available radio interfaces. For example, the framework may prioritize the radio interface according to radio coverage. More specifically, when node y is not detected, node x goes first to the radio with broadest coverage, and then iteratively switches to the radio(s) according to decreasing coverage area. In another implementation, the framework maintains a configurable list for radio interface priority, allowing a developer to establish a priority for radio switching in a virtual link.

When there is an active transfer of information between node x and node y, the framework may not rely on beacons to confirm the link. Instead, the link may be inferred from acknowledgments that information has been received. Consider, for example, a scenario in which node x is sending information to node y. When node y acknowledges receipt of all or part of that information, node x infers that the virtual link persists. When node x does not receive an acknowledgement, node x may retransmit the information. In one embodiment, when this continued, iterative transmission goes unacknowledged for a predetermined amount of time, node x infers that the physical link has failed, and switches to another of the physical links to reconnect with node y, to maintain the virtual link.

The burden of maintaining the virtual link may not fall solely on node x. In one implementation, when node y has failed to receive information, e.g., a data packet, for a predetermined period of time, it assumes that the physical link has been disconnected and switches to an alternate radio. As described above, the order of switching radios may be determined by any number of criteria, including coverage area for the radio, and this priority may be established at the framework level or at the application level, for example.

The frequency at which node x retransmits and ultimately switches to a new link may vary depending upon the application. Moreover, it may vary across an application. The framework may only use the virtual link when information to be transmitted has a relatively high threshold reliability requirement. For instance, it may be determined that if best efforts only are used to transmit objects, the virtual link will not be used, i.e., because delivery reliability is of minimized importance when best-effort transmission will suffice.

Information Dissemination

Embodiments of an improved framework according to this disclosure also may provide for effective dissemination of information within a group. In some embodiments, the burden of disseminating the information is spread across multiple nodes, including the source and receiver nodes.

In many PSI applications overhead associated with group dissemination is very high. As more devices join the group, the number of acknowledgments and re-transmissions grows quickly. Overhead is even higher when high delivery reliability is necessary.

Many conventional PSI applications rely on the source node to ensure that all receiver nodes have received information. These arrangements put most of the transmission (and re-transmission) burden on the source node. More specifically, the source node is responsible for ensuring each receiver node has all of the sent information, and thus on wireless networks, and particularly as the number of receivers increases, will consume energy much more quickly than the receivers.

Figure 6:
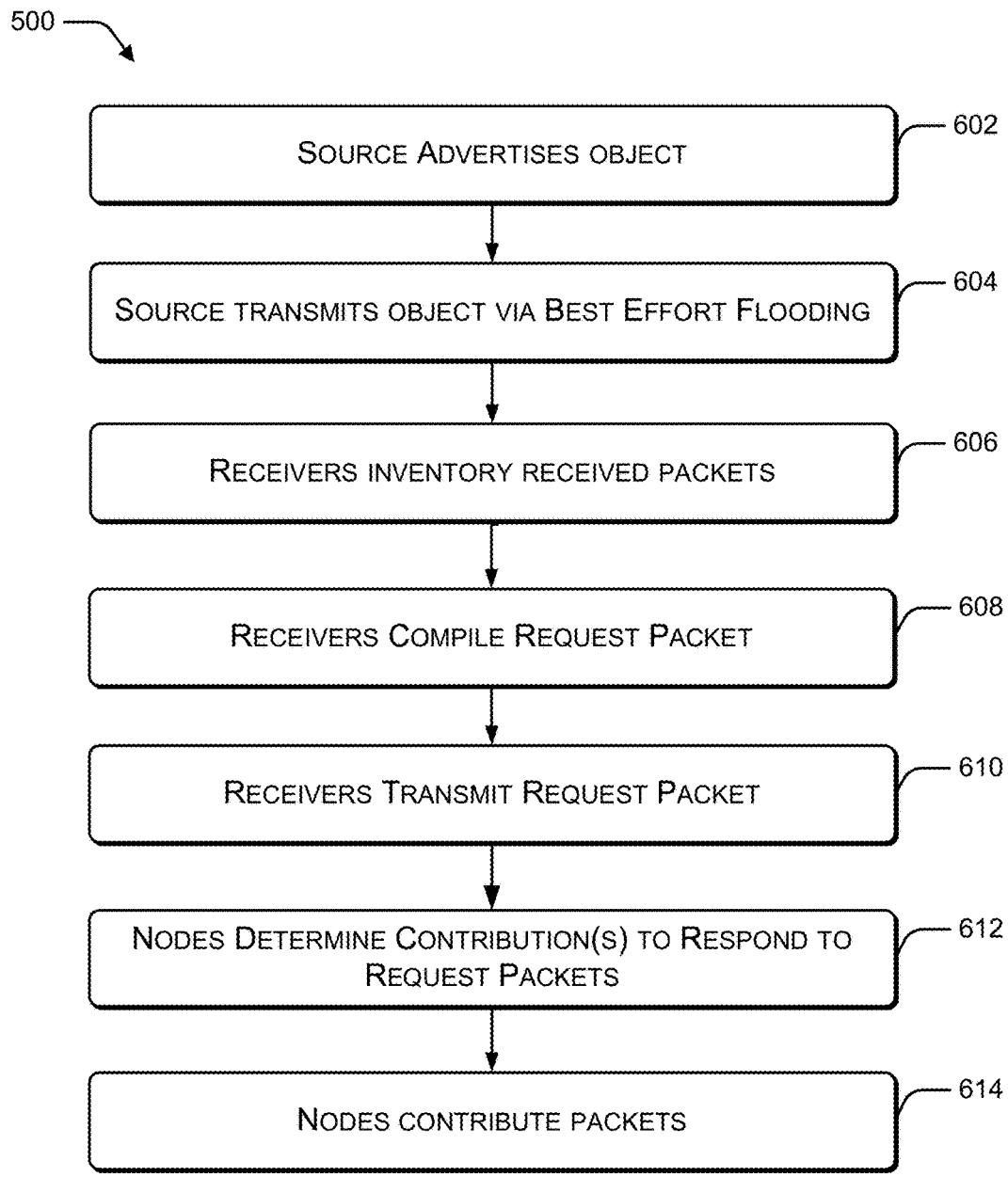
FIG. 6 is a flowchart illustrating an example method of dissemination information to members in a group.

Group dissemination of information according to one embodiment of the invention will now be described with reference to FIGS. 6 and 7. FIG. 6 is a flow-chart illustrating generally a group dissemination process 600.

At block 602 a source node advertises an object to be disseminated. In one embodiment, the advertisement is in the form of an advertisement packet that describes the entire data object. The advertisement may contain a unique data object ID, the file name, and/or the file size. Moreover, either via the advertisement packet itself or from information about transmission of the packet (e.g., by extraction from the advertisement packet), the receiver nodes preferably can ascertain the address of the source node. In implementations of this disclosure, the advertisement of the data object may be periodic, such that later-joining receivers can become aware of the data object.

Following the advertisement, at block 604, the source node begins transmitting the data object. In the implementation illustrated in FIG. 6, transmission of the data object is carried out using best effort flooding. In some implementations, block 604 is commenced immediately after block 602, without any communication from any receiving node. In other implementations, the source may wait for an acknowledgement from one or more receiver nodes before transmitting the data object.

In some implementations, the data object may be fragmented, with each fragment or smaller packet having a data object ID, a fragment sequence number, and a fragment payload. The data object ID may be a 32-bit unique data object ID and the fragment sequence number may be a 16-bit fragment sequence number, for example. The information in each packet preferably uniquely identifies the packet content and its position inside the data object.

At block 606, each of the receiving nodes inventories the packets it has received. In one implementation, this block commences for each receiver node when a predetermined amount of time has passed since it has received any packet.

At block 608, each receiver compiles a request packet. The request packet may be a positive or a negative acknowledgement of packets, i.e., a list of packets received or a list of packets not received. The determination of whether to make requests positive or negative may be predetermined, e.g., by the framework or by the developer. In some implementations, whether the request packet is a negative or positive acknowledgement depends upon the number of packets comprising the data object actually received. For example, when fewer than half of all data object packets are received, the request packet may identify the packets received, whereas when more than half of the data object packets are received, the request packet may identify the packets not received. Such an arrangement may be more efficient.

After compiling its request packet, at block 610, each receiver transmits its request packet. In a preferred embodiment, the request packet is sent to all other nodes in the neighborhood. This embodiment contrasts with conventional delivery schemes, in which each receiver node corresponds only with the source node to request the packets it did not receive. In some implementations, the request packet may be sent to some subset of the nodes in the neighborhood. While the subset may include only the source node, in presently preferred implementations, the subset includes at least one other receiver node. Depending, for example, upon reliability of the transmission method used to accomplish block 610, each receiver may transmit its request packet a plurality of times.

After block 610, each node in the neighborhood will have received a request packet from each receiver node. At block 612, each node determines which packets it can contribute to other nodes, i.e., to respond to the request packets. In one implementation, each node aggregates all request packets it has received. In practice, this aggregation may commence upon the expiration of a predetermined amount of time after a request packet is received. Once the aggregation is complete, each node can estimate the network-wide reception ratio for each packet, and, by comparing its received packets with the aggregated list of missing packets, can determine which (if any) packets that node can contribute.

Having determined which packets it can contribute, at block 614, each node contributes packets to fulfill the requests of other receiver nodes.

Each node may commence block 614 blindly, i.e., by sending any packet it can contribute to all other nodes, but in other implementations, the delivery of unreceived packets is scheduled. Scheduling delivery of the unreceived packets may be used to achieve a more efficient lost packet contribution system, in which multiple nodes are not contributing the same packets, but all packets are being contributed. Two techniques for achieving a more efficient lost packet contribution system will now be described.

Naïve schemes without coordination do not always work, because it is possible that two nodes will pick the same random output and thus trigger the same behavior. As noted above, efforts are duplicated if both eligible nodes contribute. Moreover, idle periods are wasteful if no node contributes. In one implementation of an improved framework for PSI applications, all eligible nodes are provided with the same random sequence by manipulating a pseudo-random seed. For example, each node may include a random number in it request packet. When an eligible node, i.e., a node having a requested packet, decides whether to contribute the requested packet, it uses the sum of all numbers as the seed. In one example implementation, such a decision is made based on the generated random number modulo the node ID. The result of the modulo operation will determine whether to send the requested packet. For example, if the result is even or odd, the packet may be contributed.

As with the transmission of request packets, packets sent to fulfill the requests may be sent more than once. For example, when delivery reliability is expected to be lower, it may be desirable to send the packets more times.

Even with the first technique just described, there still may be instances in which more than one eligible node contributes the requested packet. To further limit the chance of this happening, a framework according to this disclosure also randomizes the order of outgoing packets identified in the first technique. In this manner, while multiple nodes may determine that they should contribute the same packet, they will likely send the packet at different times. This enables suppression by overhearing. Specifically, if a node hears a packet recovery has been performed, it removes that packet from the outgoing packet queue.

Figure 7:
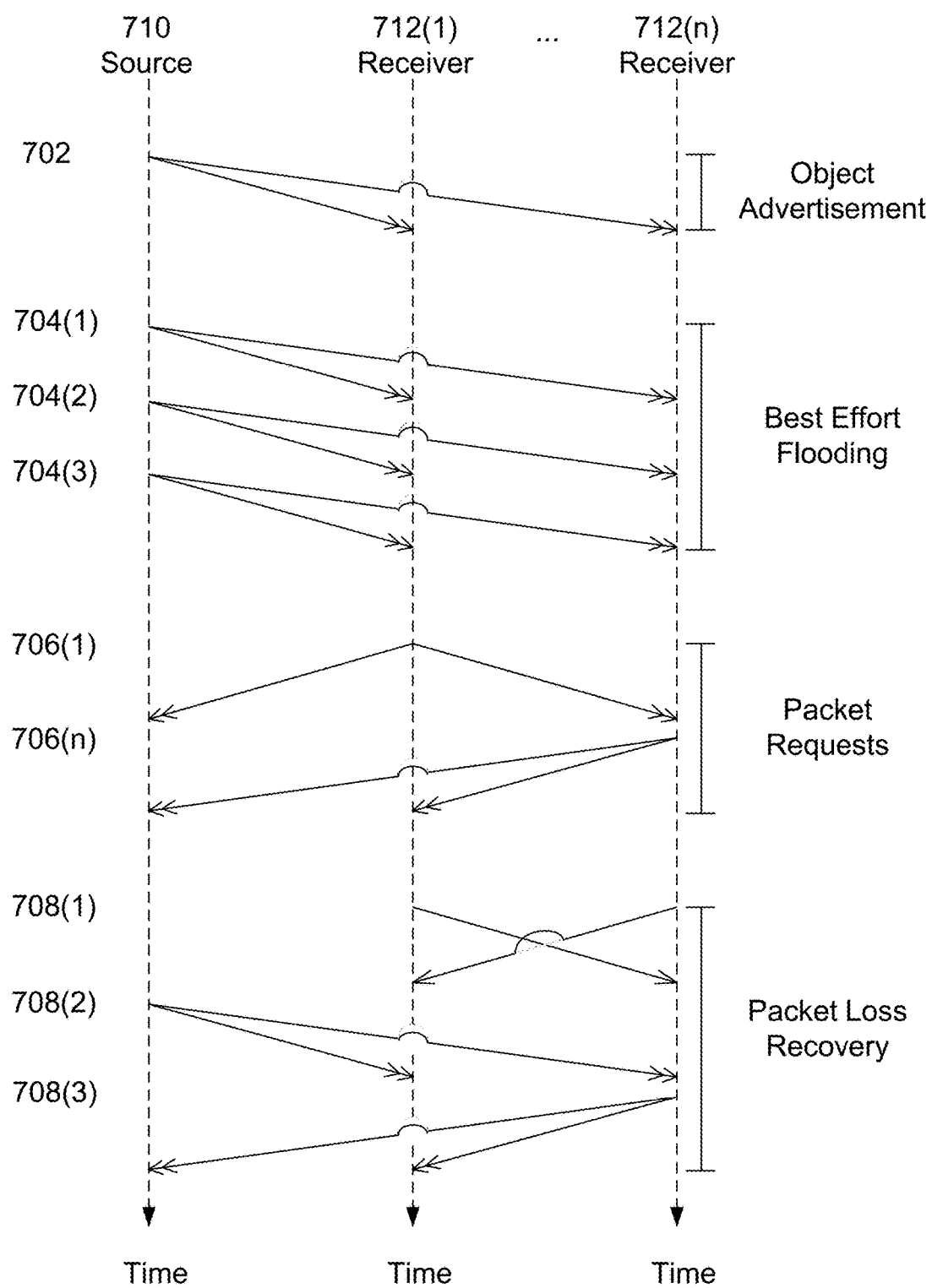
FIG. 7 is a flow diagram of the example method of group dissemination of information illustrated in FIG. 6 for each of a source node and a plurality of receiver nodes.

FIG. 7 schematically illustrates the process of FIG. 6. In FIG. 7, each of a source node 710 and a plurality of receiver nodes 712(1), . . . , 712(n), is provided with an associated vertical axis. Each of these vertical axes represents time. For clarity of illustration, only two receiver nodes 712(1), 712(n) are illustrated, but it is to be understood that the disclosure is not limited to two receiver nodes. In fact, in many implementations three or more nodes will participate in the PSI app.

Also in FIG. 7, each arrow represents transmission of data. Thus, for example, in an object advertisement phase there are two arrows, both originating at the source node 710 and associated with an advertisement packet 702. One arrow terminates at the receiver node 712(1) and the other terminates at the receiver node 712(n). The arrows represent transmission of the object advertisement packet 702 to all nodes. Both arrows associated with the object advertisement packet 702 are double-headed. In FIG. 7, double-headed arrows are used to illustrate multicast transmission (i.e., transmission to all other nodes) whereas single-headed arrows are used to illustrate unicast transmission (i.e., node-to-node transmission. While the terms "multicast" and "unicast" are generally understood in the context of Wi-Fi, this disclosure is not limited to Wi-Fi. Other protocols and applications may be used to achieve the same ends, namely, selective transmission to all members of a group or to a specific node or nodes in a group.

Thus, in the example of FIG. 7, the advertisement packet 702 is transmitted by the source node 710 to all receiver nodes 712(1), . . . , 712(n). Thereafter, the source node transmits object packets 704(1), 704(2), 704(3), each comprising a fragment of the data object, to all receiver nodes in a best effort flooding phase. FIG. 7 illustrates three object packets 704(1), 704(2), 704(3), but more or fewer may be required to send the entirety of the data object. Moreover, while FIG. 7 shows that each packet is sent only once, they may be sent a plurality of times, to increase the likelihood that packets are received.

Invariably, however, all packets will not be received by all receiver nodes. In a benchmarking test carried out by the inventors 10,000 multicast packets were sent via Wi-Fi (IEEE 802.11) from a source to three different mobile phones, each under a different access point. The test was carried out four times, and the packet reception ratio varied greatly as to each phone, but also across iterations on the same phone. As an average over the four tests, only 7.51% of the packets were received by all three receivers. Because not all packets are received by all nodes, packet recovery may be necessary or beneficial.

As noted above, conventional systems have each receiver node correspond directly with the source node to recover lost packets. This puts a large burden on the source node, though. And, in the benchmarking test described above, an average of only 0.55% of all packets over the four tests were not received by any of the receivers. These packets must be recovered from the source node. However, the test showed that 91.94% of the packets were received by at least one receiver. Thus, implementations of this disclosure allow for recovery of lost packets from other receivers, not just from the source node.

Once the best effort flooding phase is complete, each of the receivers compares its received packets to a list of packets contained in the object advertisement and formulates a request packet. As described above, the request packet contains information sufficient to ascertain which packets were lost for that receiver. It may be a list of all missing packets, or a list of all received packets. The receiver nodes 712(1), 712(n) send respective request packets 706(1), 706(n) via multicast to all other nodes (including the source node 710).

Once each node has received all packet requests, a packet loss recovery phase begins. As described in more detail above, each receiver node may compare its received packet(s) to the requested packet(s) to determine whether it can contribute a packet for recovery. Recovery packets 708(1), 708(2), 708(3) are then sent by and between the nodes, to complete the requests. In some instances, for example, in the case of the recovery packets 708(2), 708(3), the recovery packets are sent via multicast. In this manner, transmission of recovery packets may be overheard by other contributing nodes, for example, so those nodes can stop transmission of would-be duplicate packets. The framework may implement only multicast transmissions, for at least these reasons. However, in other instances, the recovery packets may be sent via unicast. In FIG. 7 recover packets 708(1) are illustrated as being sent via unicast. Unicast transmissions may not have the benefit of being overheard, but they may be more reliable. Other benefits may also be realized by unicast transmission.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
exposing an application programming interface to be called by a proximity-based social interaction application;
receiving a call of the application programming interface; and
providing, in response to receiving the call, a plurality of hints relating to characteristics of the proximity-based social interaction application, the plurality of hints being used to aid in configuring the characteristics for the proximity-based social interaction application, and the plurality of hints relating to at least two of: a destination application hint specifying a number of devices to be used in the proximity based social interaction application to aid in optimization for point-to-point data transmissions, a reliability application hint specifying reliability requirements comprising at least two reliability classes for data transmissions between nodes running the proximity based social interaction application to aid in reduction in transmission overhead, a frequency and range application hint specifying behavior and scope of discovery data transmissions to aid in the discovery of beacons, or a latency application hint for specifying latency tolerances for data transmissions between the nodes to aid in scheduling efficiencies for data transmissions.

2. The method of claim 1, wherein the destination application hint relating to the number of devices suggests at least one threshold number of devices intended to use the proximity based social interaction application in a physical proximity.

3. The method of claim 2, wherein when the number of devices intended to use the proximity based social interaction application is above the threshold, information is disseminated between nodes running the application in a first manner and when the number of devices is below the threshold, information is disseminated between the nodes running the application in a second manner.

4. The method of claim 1, wherein the at least two reliability classes comprise best effort and reliable.

5. The method of claim 1, wherein the frequency and range application hint establishes an initial beaconing frequency.

6. The method of claim 1, wherein frequency and range application the hint establishes a decrease in beaconing frequency.

7. The method of claim 1, wherein the latency application hint specifies a tolerated latency for conveyance of information between nodes running the application.

8. The method of claim 1, wherein at least one of the hints relates to one of a delivery frequency or a delivery transmission range.

9. One or more computer-readable media storing instructions executable by one or more processors to configure a device including a communication interface to perform operations comprising:
    exposing an application programming interface to be called by a proximity-based social interaction application;
    receiving a call of the application programming interface; and
    providing, in response to receiving the call, a plurality of hints relating to characteristics of the proximity-based social interaction application, the plurality of hints being used to aid in configuring the characteristics for the proximity-based social interaction application, and the plurality of hints relating to at least two of: a destination application hint specifying a number of devices to be used in the proximity based social interaction application to aid in optimization for point-to-point data transmissions, a reliability application hint specifying reliability requirements comprising at least two reliability classes for data transmissions between nodes running the proximity based social interaction application to aid in reduction in transmission overhead, a frequency and range application hint specifying behavior and scope of discovery data transmissions to aid in the discovery of beacons, or a latency application hint specifying latency tolerances for data transmissions between the nodes to aid in scheduling efficiencies for data transmissions.

10. The one or more computer-readable media of claim 9, wherein the destination application hint relating to the number of devices suggests at least one threshold number of devices intended to use the proximity-based social interaction application in a physical proximity.

11. The one or more computer-readable media of claim 10, wherein when the number of devices intended to use the proximity-based social interaction application is above the threshold, information is disseminated between nodes running the application in a first manner and when the number of devices is below the threshold, information is disseminated between the nodes running the application in a second manner.

12. The one or more computer-readable media of claim 9, wherein the at least two reliability classes comprise best effort and reliable at least one of the hints relates to a reliability requirement for specifying one of a plurality of reliability classes for conveyance of information between nodes running the application.

13. The one or more computer-readable media of claim 9, wherein the frequency and range application hint establishes an initial beaconing frequency.

14. The one or more computer-readable media of claim 13, wherein the frequency and range application hint establishes a decrease in beaconing frequency.

15. The one or more computer-readable media of claim 9, wherein the latency application hint specifies a latency tolerance for conveyance of information between nodes running the application.

16. The one or more computer-readable media of claim 9, wherein at least one of the hints relates to one of a delivery frequency or a delivery transmission range.

17. The method of claim 7, wherein the latency tolerance comprises a time.

18. The method of claim 17, wherein the latency tolerance comprises a number of packets to be aggregated before transmission.

19. The one or more computer-readable media of claim 15, wherein the latency tolerance comprises a time.

20. The one or more computer-readable media of claim 19, wherein the latency tolerance comprises a number of packets to be aggregated before transmission.

* * * * *